Oct. 30, 1956

H. WALDMAN

TELEPHONE MESSAGE RECORDING AND MESSAGE REPEAT BACK SYSTEMS 2,769,033

Filed Sept. 21, 1951

6 Sheets-Sheet 1

INVENTOR.
HERBERT WALDMAN

BY Louis Casper

ATTORNEY

Oct. 30, 1956 H. WALDMAN 2,769,033

TELEPHONE MESSAGE RECORDING AND MESSAGE REPEAT BACK SYSTEMS

Filed Sept. 21, 1951 6 Sheets-Sheet 2

INVENTOR.
HERBERT WALDMAN
BY [signature]
ATTORNEY

INVENTOR.
HERBERT WALDMAN
BY [signature]
ATTORNEY

INVENTOR.
HERBERT WALDMAN
BY [signature]
ATTORNEY.

Oct. 30, 1956 H. WALDMAN 2,769,033

TELEPHONE MESSAGE RECORDING AND MESSAGE REPEAT BACK SYSTEMS

Filed Sept. 21, 1951 6 Sheets-Sheet 5

INVENTOR.
HERBERT WALDMAN

BY Leo Casper
ATTORNEY

INVENTOR.
HERBERT WALDMAN
BY [signature]
ATTORNEY

United States Patent Office 2,769,033

Patented Oct. 30, 1956

2,769,033

TELEPHONE MESSAGE RECORDING AND MESSAGE REPEAT BACK SYSTEMS

Herbert Waldman, Brooklyn, N. Y.

Application September 21, 1951, Serial No. 247,670

12 Claims. (Cl. 179—6)

My invention relates to telephone message recording systems and particularly relates to a system whereby a caller from a regular telephone station can call a distant party's telephone through the regular procedure for calling said distant party's telephone, and upon the ringing of the bell at said party's location, and assuming the said party is absent, said ringing of said bell will cause a phonograph or similar voice recorder to operate, such operation resulting in a voice reproduction, said voice reproduction stating, through the medium of the mouthpiece of said telephone, that the party is absent and further requesting the caller, upon hearing the ringing of a single stroke bell that shall be made audible to the listener, to speak his message and such spoken message will be recorded and such record will await the return of the party to whom the call has been made; also further requesting that the party cease talking when said party shall have heard a second single stroke sound from said bell contained in the message recording arrangement at the distant telephone location. In this manner the time duration of a telephone message is determined.

Another object of the invention is the utilization of a recording arrangement that will in no way interfere with the equipment of the telephone company, so that no changes or effacement of any character need be made of such equipment, nor in any manner interfering with the normal operation prescribed by the telephone company.

A further object of the invention is the function of directing the distant caller when to start and when to stop speaking his message, and such messages being recorded and stored regardless of the number of calls that have been made up to the limit length of the magnetic recorder tape or wire of said recording device.

A further object of the invention is to provide facilities for the party to whom the telephone message shall have been directed, to enable said party to obtain such message or messages at a distant point from where said messages shall have been recorded over the regular telephone company's system by first making a call in the usual manner, thus obtaining connection with said party's home or office phone location, and after the playing back of the recorded voice, announcing the absence of the owner of the phone, to then proceed to transmit over said telephone circuit a coded call in timed sequence which when properly made will cause the motor propelling said magnetic wire or tape to be activated and unwound, and thereby causing said messages on said wire or tape to be played back over said mouthpiece to said distant caller whether there be one or a multiple number of said messages that were previously recorded on the magnetic wire or tape from calls during the absence of the party to whom the calls were made.

A further object of the invention in connection with the foregoing is the provision to trap or circumvent any unauthorized person from endeavoring to make a call from a distance in order to surreptitiously obtain such messages.

Other objects and advantages of the invention will appear consequent to the following description and in connection with the accompanying drawings, in which.

Figure 1:
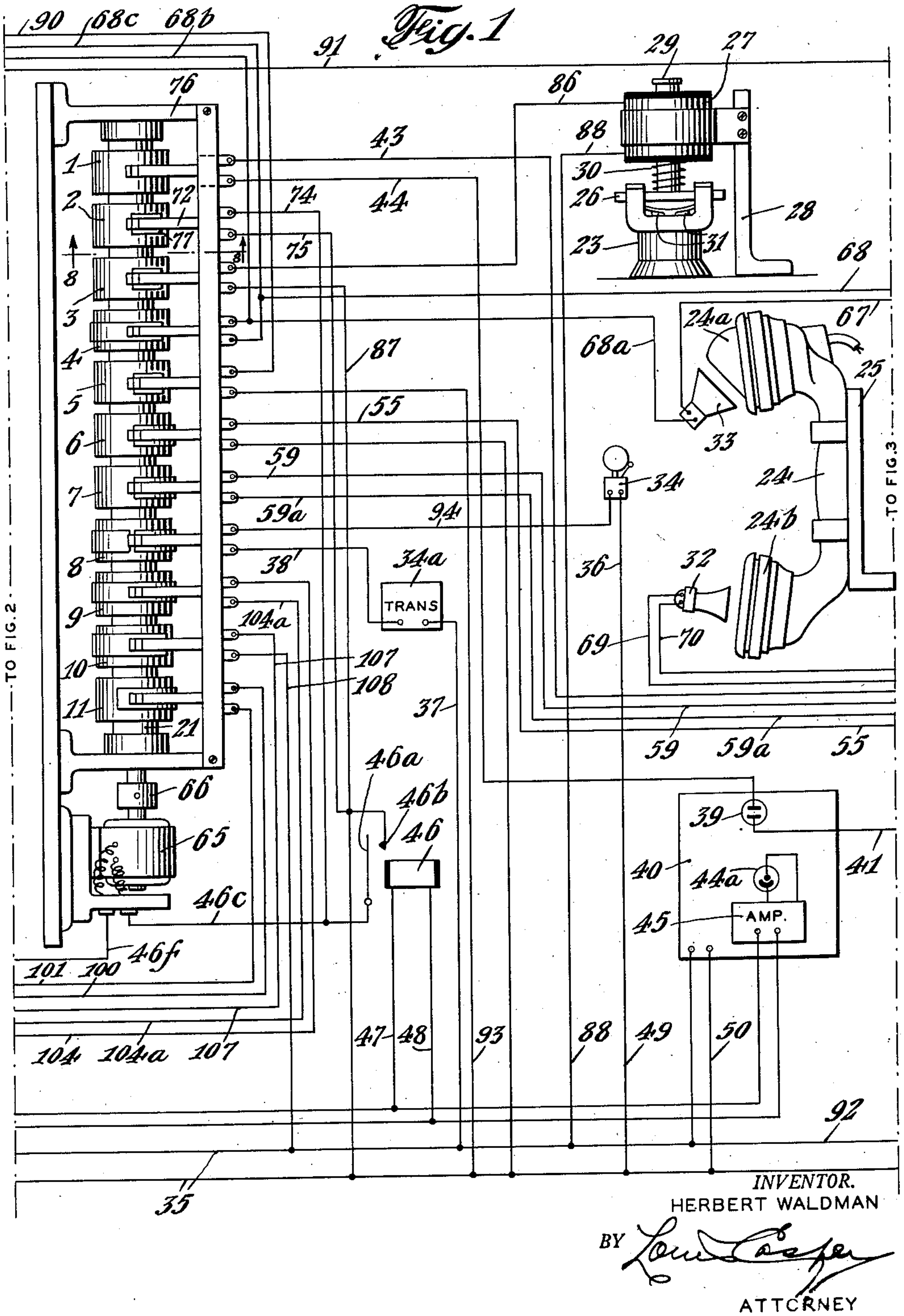
Fig. 1 is one section of the answer back recording system showing the wiring arrangement which connects up the various parts of the system.
Figure 2:
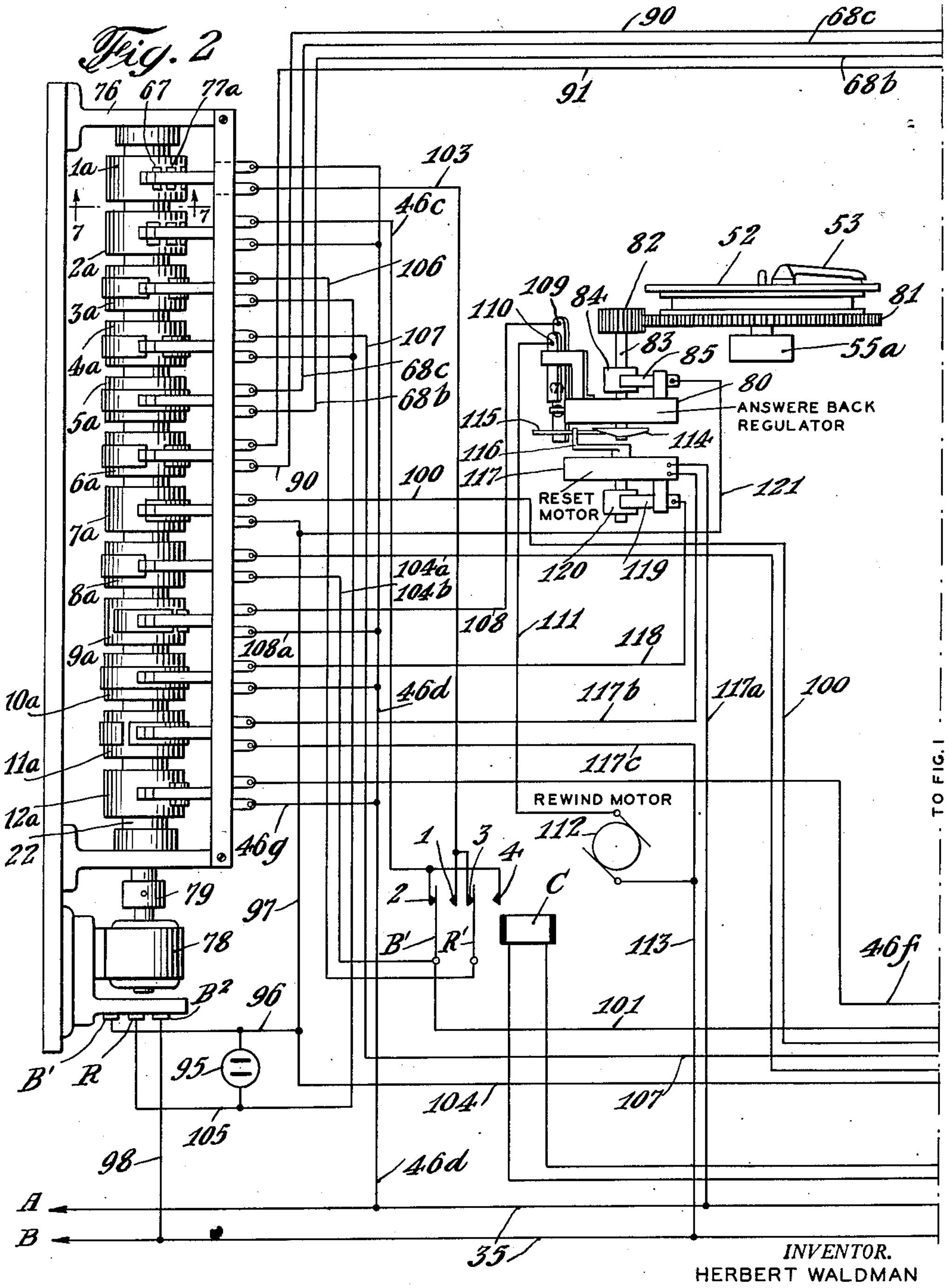
Fig. 2 is the second interconnecting section of the system.
Figures 3, 6:
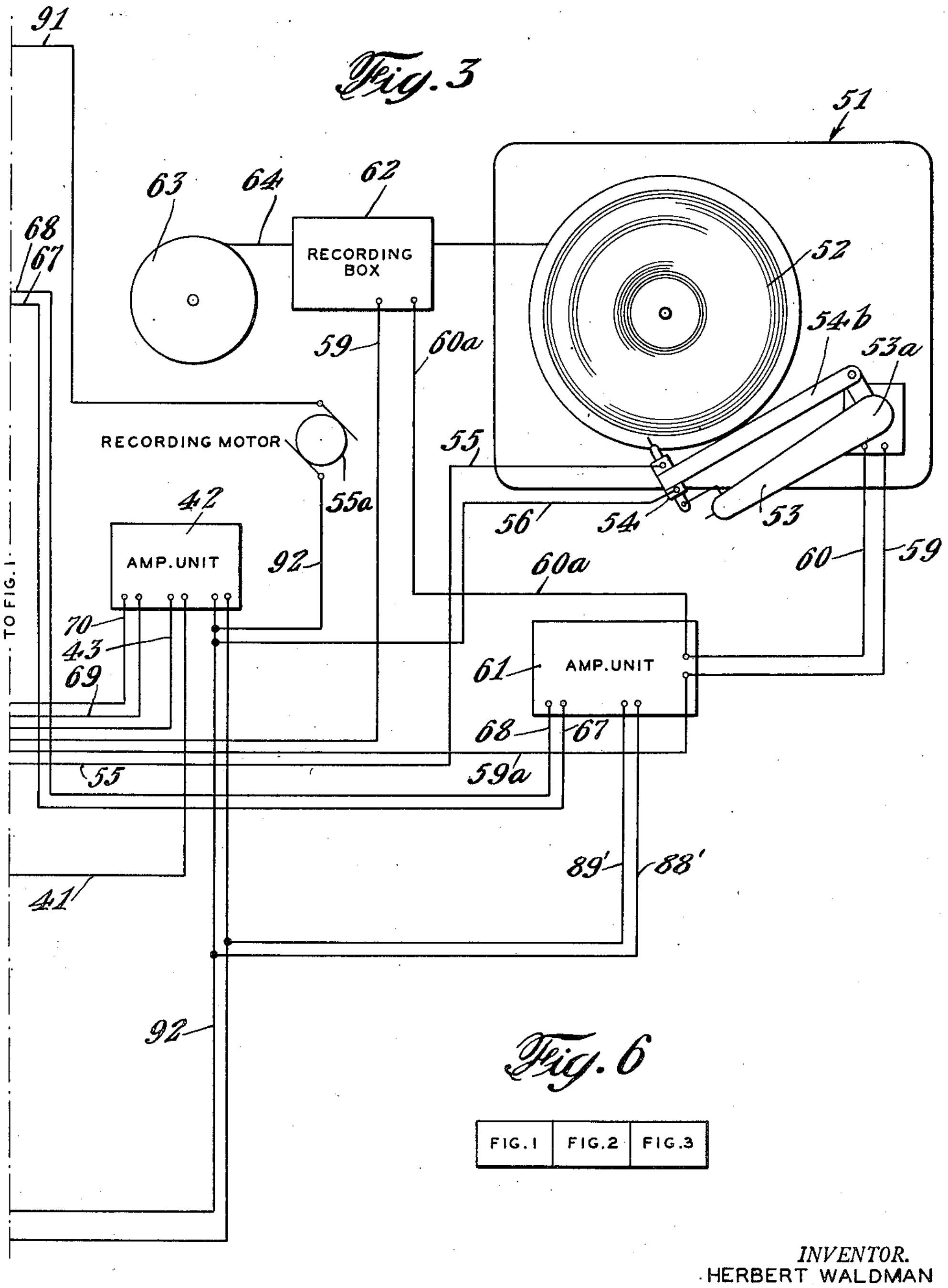
Fig. 3 is a third interconnecting section of the system.
Figures 7, 8:
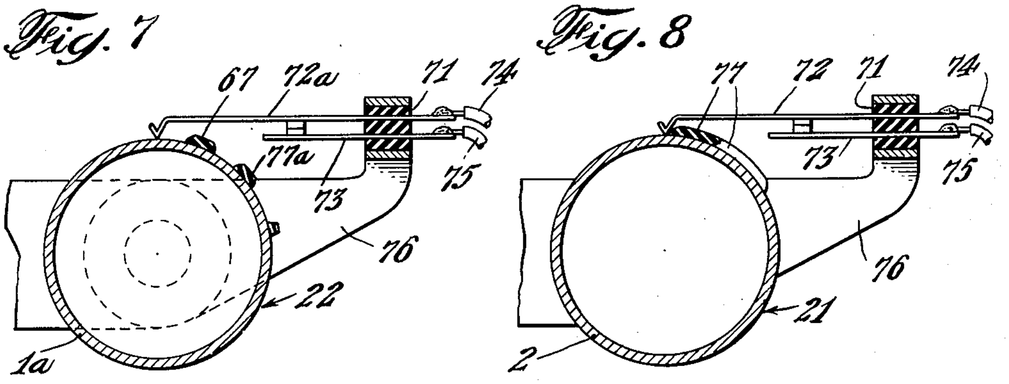

Fig. 6 discloses the manner in which Figs. 1 to 3 may be arranged with respect to each other to form a complete system;

Fig. 7 is a section taken on the line 7—7 of Fig. 2;

Fig. 8 is a section taken on the line 8—8 of Fig. 1; and

Figures 9, 10:
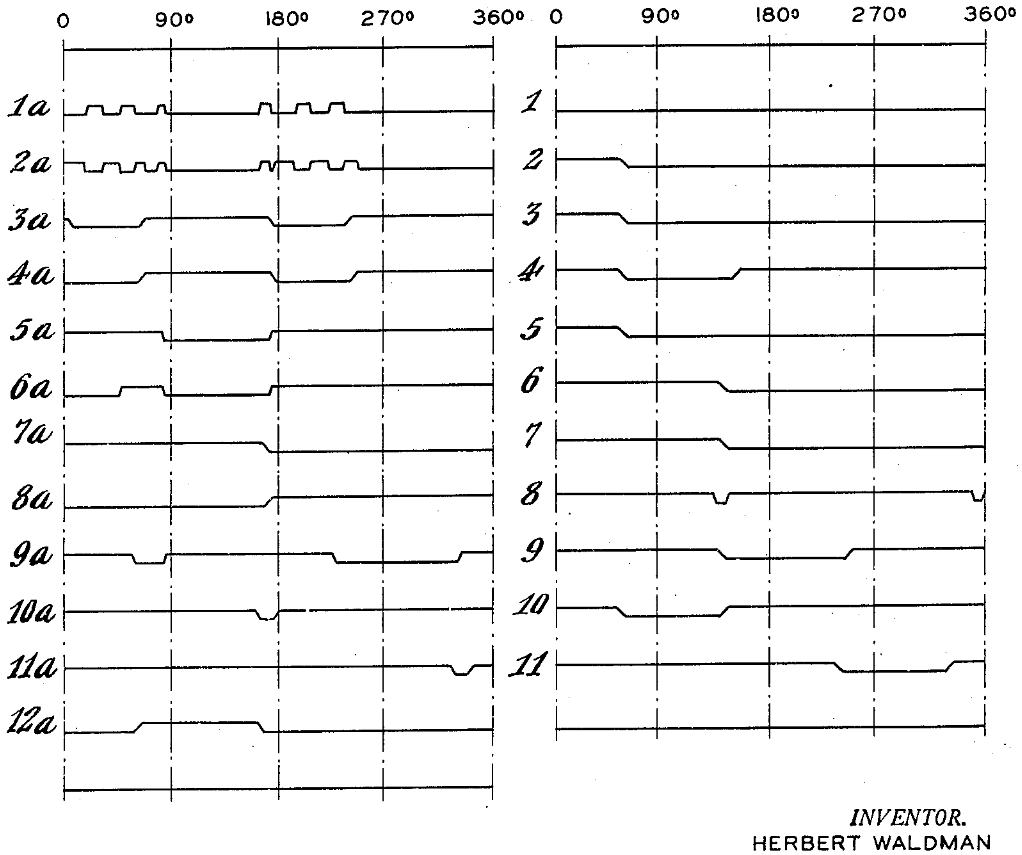

Figs. 9 and 10 show diagrammatically developed views of commutator rings upon shafts 21 and 22.

*General description of message recording system*

Referring now to the combined Figs. 1 and 2, the system illustrated therein shows the base 23 of a standard telephone set containing the calling bell and all other apparatus that is installed at the subscriber's station. 24 is the handset belonging to the base 23 but which is now mounted instead on the supporting bracket 25. Replacing the aforesaid handset 24 is the bar 26 which when not lifted from the base 23 rests upon the latter base, thus replacing the handset 24 insofar as closing the contact rods 31 in said base 23 is concerned. A solenoid magnet 27 is supported by a bracket 28. Said magnet has a plunger armature 29, the lower portion thereof being encased in a coiled spring 30 which maintains the bar 26 resiliently against the contact rods 31 as long as said solenoid coil 27 is not energized. The handset 24 in the position shown in Fig. 1 enables the positioning of the microphone 32 directly in front of the receiver **24*b* of the handset 24. The wire connections of the microphone 32 are through the medium of the wires 69 and 70. Wire 69 connects with amplifier unit 42 and through said unit taps to wire 70 to the opposite connection of microphone 32. The microphone 32 is likewise positioned within sound range of the bell that is within the telephone base 23 and is affected by it. The loud speaker 33 is positioned in front of the telephone transmitter 24*a* of the handset 24. A single stroke bell 34 is mounted contiguous to the transmitter 24*a* so that the bell tone from said bell may be audible to the caller. A transformer 34*a* is connected in series with the bell 34, said transformer reducing the voltage of the regular house current to the voltage required to operate the bell 34. The operating current for said bell 34 is obtained from house current 35, said house current having lead terminals designated as A and B. The bell circuit may be traced from the right hand post of said bell to wire 36, to house current terminal B. Then from house current terminal A to wire 37, to transformer 34*a*; from thence to commutator ring 8 of the shaft 21 through the wire 38, thus completing the circuit. The function of the commutator 8** in the circuit just described will hereinafter be described.

A highly sensitive neon lamp 39 is mounted on the base 40. A photoelectric cell **44*a* is also mounted on the base 40 and closely contiguous to the neon lamp 39. The circuit operating said neon lamp includes wire 41 which connects with the tap connection of amplifier unit 42 (Fig. 3) and the associated tap connection is connected to wire 43 and to commutator ring 1 of shaft 21, and from thence to wire 44 to the neon lamp 39**.

A photocell **44*a* is included in the invention, and it is a type well known in the art, to which an amplifier 45** is connected. This amplifier is also well known in the art, and the object thereof is to build up the intensity of current in the photocell circuit sufficiently to operate a relay which in the instant case is the energizing of the relay 46 through the medium of wires 47 and 48. Current is supplied to the amplifier 45 through connecting wires connected to house current 35, lead A, and wire 50 to lead B. The function of the relay 46 will hereinafter be described. Other arrangements and devices may be used instead of the neon lamp 39 in combination with the amplifier unit 42. The same objective may be attained by the substitution of a sensitive relay termed a micro-relay, in lieu of the neon light combination. Thus the sound vibrations produced by the ringing of the ringer in the telephone set base 23 will cause the micro-relay to be energized sufficiently to close contacts thereof and thus operate relays 46 and C.

A further modification may be used, replacing the neon lamp arrangement described, by the utilization of a voice operated relay similar to that described in Patent No. 2,543,807, issued March 6, 1951.

Referring specifically to Fig. 3, the numeral 51 generally denotes a main play back and recording unit. The unit 51 is provided with a turntable 52 and a motor 55*a*, which is schematically shown, for driving said turntable. A tone arm 53 operates in connection with said turntable 52 upon which a phonograph record disc is placed, said tone arm swinging on pivot bearing 53*a*.

A solenoid assembly 54 sets said tone arm 53 in operating position when selected to do so upon the record disc that is placed on said turntable; and furthermore also functions to release said tone arm from contact with said record upon signal impulses through the medium of the circuit including wires 55 and 56.

The wire 55 extends to commutator 6 of commutator shaft 21 and the wire 56 extends to house current lead A of circuit 35. From the ring 6 the wire 55 extends to house current lead B which completes the solenoid assembly 54 circuit. The function of the commutator ring 6 in this circuit will be described hereinafter.

The sound vibrations emanating from the tone arm 53 is amplified in volume through the medium of the circuit including wires 59 and 60 connected to amplifier unit 61. The amplified vibration current circuit connects with the speaker unit 33 through the medium of wires 67 and 68. The wire 68 is connected with commutator ring 4 and from thence through to the speaker 33, as explained, thus completing the speaker unit 33 circuit. A tap connection on wire 68 is shown in Fig. 1. The functions of the tap aforesaid and the commutator ring 4 will be explained hereinafter.

The recording box 62 receives sound signal pulses through the medium of wires 59, 59*a* and 60*a*.

The wire 59*a* extends from the amplifier unit 61 to commutator ring 7 of commutator shaft 21, and the wire 59 continues from said ring 7 to the opposite terminal of the recording box 62. 63 is a wheel or spool for winding or unwinding the magnetic wire 64 included in the combination wire recorder and phonograph arrangement shown schematically in Fig. 3, said arrangement including the motor 55*a* which causes the rotating movement of the turntable 52 which in turn causes the magnetic wire 64 to be wound on it.

Referring to Fig. 1, in this figure will be seen the commutator shaft 21, said shaft having 11 commutator rings. The shaft is rotated clockwise by means of the motor 65, and the shaft of said motor is connected with commutator shaft 21 by means of the coupling 66. The rotary movement of the motor 65 with the consequent rotation of the shaft 21 is controlled by the relay 46, or by the alternate contacting of the contact spring bearing on the periphery of ring 2 of said shaft 21.

An illustration of a commutator ring which is integral to shaft 21 is shown in Fig. 8. The ring is metallic, such as brass. Insulation sections are mounted on said rings, said sections being placed on certain sections of the periphery thereof and are of varied lengths arranged for timing purposes. Further reasons for said variations shall be explained in the general description of the operation of the system comprising the invention. A contact spring 72 (Fig. 8) is normally in contact with each of the commutator rings on said shaft 21. A companion contact spring 73 is mounted underneath the spring 72. Each contact spring is provided with connecting means for attaching to conductor wires which serve as connecting means for said conductor wires. Both contact springs are mounted on a bracket 76 with insulation 71 between them. As the commutator shaft rotates either clockwise or counterclockwise, the spring 72 is lifted clear of the ring when the shaft shall have moved to the portion of the ring where the insulated riser 77 is directly under the spring 72, thus separating the contacts on the springs 72 and 73. The spring 72 immediately falls into contact when said insulating riser shall have passed the V-shaped portion of the spring 72. Each of the 11 commutator rings (except ring 1) on the shaft 21 has affixed upon the respective peripheries thereof risers of insulated sections, said sections being of varied lengths in accordance with periodic timing of the opening and closing of circuits that are included in this system which comprises my invention. The insulation risers are designated as 67 and 77*a* and are shown in Fig. 7.

The commutator shaft 21 and the rings thereon are the controlling and timing sequence means in the process for recording messages at a telephone home or office station and which operates in the absence of the party called.

Interconnected with the foregoing explained wiring and apparatus is the commutator shaft designated as 22 (Fig. 2) and which is provided with commutator rings numbered from 1*a* to 12*a*, inclusive. The commutator 22 is rotated by means of motor 78. A coupling 79 connects the shaft 22 with the shaft of the motor 78. The motor 78 may rotate in either direction, clockwise or counterclockwise. The manner of controlling the rotation of the motor 78 shall be explained hereinafter in the description of the message playback operation which is included in the invention.

Referring to Fig. 1, the regular telephone base 23 upon which a telephone handset 24 normally rests has mounted upon it, as stated, the solenoid magnet 27 in place of the handset 24 which holds the contacting elements in said base in closed position through the medium of the bar 26.

When an outside call comes in, the ringing of the bell within the base 23 sets up sound vibrations which are received in the microphone 32, said vibrations being amplified through the medium of the amplifier unit 42, being connected thereto by means of wires 69 and 70; and said amplified vibrations are conveyed to the neon light 39 through the medium of the wires 41, 43 and 44. The effect of said vibrations is to cause the neon light 39 to light, thereby transmitting light waves into the photoelectric cell 44*a*, said light wave effect being amplified through the medium of the amplifier 45 which receives current energy and which is conducted through the medium of wires 49 and 50, said wires being tapped on to leads A and B respectively of house circuit 35.

The effect of said photocell activation is to close the armature of relay 46, thereby attracting contacting armature 46*a* to the contact 46*b* which is directly connected to the B lead of the house circuit 35. The closing of said contacts starts the motor 65 to rotate through wires 46*c* and 46*f*, said wires being tapped on to leads B and A respectively of house circuit 35. With said rotation the commutator 21 is also rotated. The motor 65 makes one revolution in 60 seconds, and therefore all functions of the operation of an incoming call occur during the 60-second period.

Prior to the rotation of the commutator 21, a contact spring similar to contact spring 72*a*, shown in Fig. 7, rests upon insulation 77*a* (see Fig. 4, commutator ring 2), which insulates said spring from the circuit to which it is connected. Upon the rotation of said commutator for a period of ten seconds due to the operation of the relay 46 activated by the photo-cell 44*a* that is energized by the neon lamp 39 during the ringing period of the phone 23, said ringing being caused by an incoming call, the contact spring 72 of ring 2 (Fig. 8) makes contact with said circuit for a period of 50 seconds. These connections are extensions of the contacts 46*a* and 46*b* of the relay 46, said contacting of said contacts therefore acting to prevent the motor 65 from stopping in its rotation after ten seconds rotation thereof at which time the phone contacts 31 are caused to be released by the operation of the solenoid 27 (said operation to be further described), thereby causing the phone to stop ringing.

It would be expected that the cutting off of the ringing vibrations of said phone call would result in depriving the relay 46 of the current supplied to it through the medium of the photo-cell and the consequent deenergizing of said relay and the opening of the contacts 46*a* and 46*b*, thus causing the stoppage of the motor 65 at this point of its cycle travel. However, it is at this point that the ring 2 comes into circuit connection, substituting for the contacts 46*a* and 46*b* thus ensuring the continued rotation of said motor 65 for the balance of its rotation period, viz. 50 seconds. After the ten second period of rotation (phone ringing period) the ring 3 of commutator 21 comes into circuit contact having similar insulation 77*b* as ring 2 (see Fig. 4, ring 3), said contacting closing the circuit leading to the solenoid magnet 27 through conductor wires 86, 87 and 88. The foregoing circuit also connects with power leads A and B of power circuit 35, the wire 87 leading to power wire B of power leads 35.

The foregoing operation permits the lifting of the solenoid bar 26 for a period of fifty seconds, during which time the incoming vocal message may be recorded upon the magnetic wire to tape 64.

The lifting up of the solenoid bar 26 releases the contact rods 31, thus causing the handset 24 to be connected into the outside line for normal transmission from the home station and the reception of vocal conversation from the outside.

The commutator ring 4 (see Fig. 4, commutator ring 4) being similarly provided with a contact spring 72 and also having insulation 77*x* on the periphery thereof, makes contact also at the expiration of the ten second period of commutator rotation and remains in contact for 15 seconds. During the 15 second period the speaker circuit is closed, which circuit includes wires 68, 68*a* and 67, connecting with amplifier unit 61, and receiving power therefrom through wires 88′ and 89′.

The commutator ring 5 (see Fig. 4, commutator ring 5) is connected in the circuit that controls the operation of the recorder motor 55*a* and the timing thereof. As seen from commutator 5, Fig. 4, and wire connections therewith shown in Fig. 1, the circuit including the motor 55*a* is closed and is operative after the ten second period of rotation because the contact spring similar to the spring 72 in Fig. 8 is resting on insulation 77*c* at the starting point of the rotation of commutator 21 until ten seconds shall have expired when the contact spring makes contact with the points 73 thereby closing the circuit including wires 74 and 75 as shown in Fig. 8. The circuit includes wire 90 which is connected to commutator ring 6*a* of commutator 22 and from thence to wire 91, to one terminal connection of the recorder motor 55*a*. From the opposite terminal of said motor 55*a*, a wire 92 connects with power lead A. The opposite terminal connection of commutator ring 5 is connected to wire 93 which connects with the power lead B of power lead circuit 35, thus completing the recorder motor circuit. The recorder motor circuit remains closed for the balance of the rotation cycle of 60 seconds.

It will be seen that commutator ring 6*a* of commutator 22 is connected in the recorder motor circuit. The function of commutator ring 6*a* in the circuit aforesaid will be further described hereinafter.

The recorder motor operates the turntable 52, said turntable having a record mounted thereon, said record containing a message which may read, for instance: "Mr. A is out; please leave message, and start talking when you hear the stroke of a bell (34), and continue speaking the message until a second stroke of the bell is head which is the limit period of time that you can talk."

It is obvious, of course, that the party may conclude his message before the second stroke of the bell 34.

The time interval of the aforesaid phonograph message to the earphone of the distant party is 15 seconds in accordance with the timing arrangement as planned in the herein described method of operation of the aforesaid combined "telephone message recording and message repeat back" system. It is understood, however, that such timing may be changed and other interval variations made without departing from the spirit of the invention.

In order to complete the voice transmission from the record on the turntable 52 into the speaker 33, it is necessary that the tone arm 53 be set and the needle thereof placed into the groove of the disc record in readiness to play the message that is grooved thereon. This position is attained and remains undisturbed until the commutator 21 shall have rotated for 25 seconds. When this occurs, the commutator ring 6 (see Fig. 4, commutator ring 6) causes the closing of a circuit connected with solenoid magnet 54 which is contiguous to the tone arm 53, said energizing of the solenoid magnet 54 causing the plunger thereof to lift the tone arm 53 clear of the record mounted upon the phonograph turntable 52, and the tone arm 53 is thus held in inactive position for the balance of the 60 second cycle, or for a period of 35 seconds.

After the vocal message is transmitted by means of the record on said turntable 52 and which is then cut off, the outside party speaks his message through the regular telephone receiver 24*b* and the voice vibrations therefrom are taken up in the usual manner by the microphone receiver 32 which is contiguous to the receiver 24*b* and recorded on to the magnetic wire in a manner well known in the art.

Commutator ring 7 (see Fig. 4, ring 7, insulation 77*e*) through its contacting spring arrangement, as shown in Fig. 8, closes the circuit at the proper time for operating the magnetic wire recorder 62. When this circuit is closed, through the medium of the wires 59, 59*a* and 60*a*, the magnetic wire recorder is in readiness to receive the outside vocal message. It will be noted that the magnetic recorder circuit is cut in the instant contact is made through the medium of commutator ring 6 (see Fig. 4, commutator ring 6, insulation 77*d*). The contacting of the circuit including commutator ring 6 energizes the solenoid magnet 54, thereby moving the tone arm 53 clear of mechanical contact with the record mounted on the turntable 52.

It has been previously explained that the outside caller is advised to start talking only after a preferably single stroke bell 34 is sounded. The time relation for the bell to function is governed by the commutator ring 8 in its rotation with the commutator shaft 21 (see Fig. 4, ring 8, insulation 77*f* and 77*g*). The insulation designated as 77*f* represents a 24 second period of rotation, at which period it is timed to ring the bell 34, and such action is attained by a contacting of one second duration of the contacting spring arrangement contacting with the ring 8. After the expiration of the period of one second, the circuit including said bell 34 is interrupted because of the interposition of the insulation 77g on said ring 8, said insulation holding the contact spring arrangement out of contact for a period of 34 seconds. After the expiration of said period the outside caller is supposed to have completed his message, being warned as to the time limit of his talk by the second ringing of the bell 34, the latter due to the second contacting of said contact spring on said ring 8. The duration of said contacting is for a period of one second similar to that of the first ringing of the bell 34 advising the caller at that time to start talking, as explained.

The circuit including the bell 34 may be traced on Fig. 1, one terminal connection (36) thereof connecting with the power lead B (circuit 35) and the opposite connection on said bell (wire 94) connecting with ring 8, and from thence through wire 38 to transformer 34a, and from said transformer through wire 37 to lead A of power circuit 35, thus completing the bell 34 circuit.

*Message repeat back system*

Included in my invention and an integral part thereof is a facility for enabling a telephone subscriber or otherwise authorized person to receive the recorded messages at a distance from the party's home telephone, assuming said latter location to be equipped with the system embodied in my invention. The authorized party is enabled to receive from such telephone, messages on the magnetic wire or tape previously transmitted and recorded thereon.

Furthermore, this invention safeguards the playing back of said message or messages to no one other than the person so entitled. The foregoing object is attained in a novel manner by transmission of sound, for a given period of time, then followed by a period of silence. The aforesaid periods of sound and silence are repeated alternately in accordance with a code prearranged, and preadjustment in accordance therewith of the apparatus comprising the playback system.

The effect of alternate periods of sound and silence is to first govern the direction of rotation of the motor 78 (Fig. 2). Said motor, as can be seen, is connected to the commutator shaft 22, the latter having 12 commutator rings integral thereto. The rings on said shaft are similar to the rings on shaft 21, having insulated portions mounted on the peripheries thereof for the purpose of interrupting circuits included in the system, said interruptions being made through the medium of contact springs contacting with said rings, as shown in Fig. 7, and the description heretofore made thereof.

Referring to Fig. 2, the motor 78 is provided with three connections designated B′, R′ and $B^2$. The connection B′ connects with one terminal of a condenser 95 through a wire to a tap connection thereof, and the other connection of the condenser 95 is tapped onto wire 105, which connection causes the bridging of motor 78 terminal connections B′ and R′. The wire 98 connects the motor terminal $B^2$ with the power lead B of the circuit 35.

The direction of the motor 78 is determined by the connections B′ or R′ in contact with the condenser 95 and therefrom in contact with the power lead A of the circuit 35. When the connection B′ is brought into contact with the power lead A, the motor 78 rotates clockwise, and when the connection R′ is brought into contact with the power lead A, said motor rotates counterclockwise.

The above described selection of contacting with the power lead A is determined by the position of the tongues B′ and R′ of the armature of relay C in relation to the contact position (open or closed) of the contact springs of the rings 1a and 2a of shaft 22, as hereinafter to be explained.

Referring to Fig. 2, the connection B′ on the motor 78 is extended to the armature tongue B′ of the relay C in the following manner: The wire 104 is tapped onto the wire 96 and also connects with one of the contact springs of commutator 9 of shaft 21, and from thence to the wire 104a which is connected with the second contact spring of said commutator 9, and from thence to ring 8a of shaft 22. Further connection is extended through the medium of the opposite contact of said ring 8a to the wire 104b which connects with the armature tongue B′ of the relay C. Similarly the connection B′ is connected to the armature tongue B′ of the relay C, also through the commutator ring 7a of shaft 22 in conjunction with the commutator ring 11 of shaft 21 through the medium of wires 97, 100 and 101. The connection R′ of the motor 78 is extended to the armature tongue R′ of relay C through the medium of the wire 105 to one of the contact springs of the ring 3a, and from the opposite contact spring of said ring 3a connected to the wire 106 which extends to the armature tongue contact R′ of the relay C.

The functions of the aforesaid rings and timing relationship thereof shall be further explained hereinafter.

Referring again to Fig. 2, the power lead A of the circuit 35 has a tap wire 46d on it which connects with one of the contact springs of the ring 1a and from the opposite contact of said ring 1a to which the wire 103 is connected to the relay C contacts 1 and 3. It is obvious from the foregoing that when the contact springs bearing on the ring 1a are closed, the power lead A will be connected to the contacts 1 and 3 of the relay C.

An identical arrangement is provided for the contacts 2 and 4 of the relay C through the medium of the commutator ring 2a and wires 46e and 102 in order that they too may be connected to the power lead A when the contact springs of the ring 2a are closed.

With the above in mind, the method of determining the contact position of the power lead A relative to the position of the armature tongues B′ and R′ of the relay C in relation to the contacting position of the contacting springs of the rings 1a and 2a will become clear. Assuming the contacting springs of the ring 1a are in contacting position, that is, they are contacting with each other, thus closing the circuit with respect to one contacting spring with the other contacting spring. This, as previously stated, would connect the power lead A to the relay C contacts 1 and 3. Now, if it is operatively necessary that the power lead A be connected to the B′ connection, this is accomplished by energizing the relay C coil thus attracting the tongue B′ to relay contact 1. In this event the motor 78 would be caused to rotate clockwise, for reasons already stated above, provided the contact springs of the rings 8a and 9, or rings 7a and 11, are also closed. Furthermore, if required in a selective operation, the power lead A can be connected to the R′ connection by leaving the armature tongue R′ in a retracted position in which event said armature tongue R′ will contact with the relay contact 3. This is accomplished by the deenergizing of the coils of the relay C. In this event the motor 78 is caused to rotate counterclockwise.

In further explanation, let it be assumed that the contacting springs of the ring 2a are in contacting position, that is, the contacting springs thereof bearing thereon are contacting with each other; such contacting would connect the power lead A to the relay C contacts 2 and 4. In this event, the detracted and attracted positions of the armature tongues B′ and R′ respectively would cause the power lead A to be connected to said connections B′ and R′ respectively, resulting thereby in the rotation of the motor 78 in a clockwise or counterclockwise direction respectively providing the contact springs of the rings 6a and 9 or 7a and 11 are closed.

*Coding procedure*

It has been shown that means have been provided to control the rotation of the motor 78 and consequent rotation of the shaft 22 by controlling the position of the tongues B′ and R′ in relation with the contacting position of the contacting springs of the rings 1a and 2a. Through the medium of said control, it is possible to provide a selective coding transmission system in which planning thereof there is included the control of said armature tongue contacts B′ and R′ of the relay C in a manner to cause them to be in such a position in relation to the contacting position of the contacting springs of the commutator rings 1a and 2a so as to cause said motor 78 to rotate clockwise only if the code be correctly transmitted, and to rotate counterclockwise if it be incorrectly transmitted.

The code comprises a combination of a period of sound transmission and a period of silence, said "sound" and "silent" periods being performed in measured periodic sequence, alternately transmitted into the microphone 32. When sound is transmitted, the vibrations thereof are impinged upon said microphone 32 and are amplified through the medium of the amplifier unit 42, said amplified vibrations being conveyed to the neon light 39 in the manner already described above.

The effect of said vibrations, which have been previously stated, is to cause the neon light 39 to light, thus activating the photocell 44 which in turn energizes the relay C through the medium of conducting wires 47 and 48 thereby attracting the armature tongues B′ and R′ to the relay C contacts 1 and 4, respectively. On the other hand, at the cessation of sound the armature contacts B′ and R′ are caused to retract and to make contact with relay contacts 2 and 3 respectively, due to the cutting off of the current supplied by said photocell 44 to the relay C.

Now, assuming the contact springs of the ring 1a of the shaft 22 are closed, which would cause the relay C contacts 1 and 3 to make contact with the power lead wire A through conductor wires 103 and 46d, it would then be necessary in order to rotate the motor 78 clockwise to cause the armature tongue contact B′ to be attracted to contact 1 of relay C, consequently connecting the power wire A to the b connection of said motor. This is accomplished by transmitting sound vibrations into the microphone 32, as previously explained. On the other hand, failure to do so would cause the armature tongues B′ and R′ to retract, thus causing the motor 78 to rotate counterclockwise due to the contacting of the armature tongue R′ with the power lead A through the medium of the relay C contact 3 consequently connecting the power wire A to the R connection of said motor, providing the spring contacts of the ring 3a are closed. Now, if the contact springs of the ring 2a are closed, this would cause the power lead A to be connected to the relay C contacts 2 and 4 through the medium of the wires 46e and 102. Then, if the armature tongue B′ be left in its retracted position thereby making contact with the relay contact 2, the motor 78 would be caused to rotate clockwise because of the contacting of the armature tongue B′ with the power lead A through the medium of the relay contact 2. This is accomplished by the cessation of sound into the microphone 32, as already explained.

If, on the other hand, sound vibrations are caused to enter said microphone 32, such action would cause the armature tongues B′ and R′ to become attracted to the relay contacts 1 and 4, respectively, and for reasons previously stated, will cause the motor 78 to rotate counterclockwise due to said contacting of the armature tongue R′ with the power lead A through the medium of relay contact 4, and providing the contacting springs of the ring 3a are closed (that is, they are cross-connected).

In view of the foregoing description, it is obvious that if the contact springs of the rings 1a and 2a are alternately closed and opened while the shaft 22 is rotating, a corresponding combination of a sound period is transmitted followed by a period of silence or cessation of sound into the microphone 32, and the foregoing procedure being continued alternately comprises essentially the coding means; said coding means when transmitted in the manner stated will cause the motor 78 to rotate clockwise, precluding a counterclockwise rotation thereof, unless the code be incorrectly transmitted.

It will be seen from the foregoing description that the alternate opening and closing of the contact springs contacting with the rings 1a and 2a in the rotation thereof perform necessary functions in the code transmission operation.

An example of a code combination is as follows: While the contact springs of the commutator ring 1a are closed for 4 seconds (4 seconds sound) (see Fig. 5, rings 1a and and 2a), the commutator ring 2a is open (open circuit) during the same time period. Then the ring 1a opens for 3 seconds during which time ring 2a is closed (3 seconds silence). The ring 1a then closes for 3 seconds (3 seconds sound) and ring 2a opens (open circuit) for the same period of time. Now, ring 1a again opens for 3 seconds and the contact springs of the ring 2a are again closed for 3 seconds (3 seconds silence). Then the ring 1a closes for 2 seconds (2 seconds sound) during which time the ring 2a is open. The above description ends the coding period, and then the contact springs of both rings 1a and 2a close for three seconds and open for one second, then close again for 23 seconds, after which said rings open for a period of 2 seconds. At this point the code timing is repeated, after which the contact springs of said rings are closed for 31 seconds thus completing the rotation cycle of the shaft 22.

The purpose of the second coding period will be further explained hereinafter.

The commutator ring 3a serves as a protective element in that it prevents any change of getting the code transmission (see Fig. 5, rings 1a, 2a and 3a) through when inaccurately made. This preventive element is brought about when said commutator ring 3a contact springs are contacting, thereby completing the circuit including the connection R′ on motor 78 through wire 105 to one connection on ring 3a, and from the opposite connection thereof through wire 106 to armature tongue R′ of relay C; therefore, should an incorrect code transmission be made, the motor 78 would be caused to rotate in a reverse direction through the contacting of contacts 3 or 4 in relay C when making contact with the armature tongue R′, which contacting would throw in the condenser 95 which is bridged between wires 96 and 105, and such bridging action would cause the motor 78 to reverse due to the discharge of the condenser 95 aforesaid.

In further description of the function of the commutator ring 3a, it will be borne in mind that after the 15 second code transmission period, the motor 78 must under all circumstances regardless of "sound" or "silence" periods that may occur thereafter, rotate only in a clockwise direction in order to provide the circuit connections necessary for the successful playing back of the recorded messages. The ring 3a has a function in this connection to interrupt the contacting connection R on the motor 78 to the relay C armature tongue R′ when the latter contacting springs are in open position, thus eliminating the counterclockwise rotation possibility of said motor. It therefore follows that the contacting springs of the ring 3a must be open after the coding period shall have been terminated.

In accordance with the above, the timing periods of the ring 3a are as follows: The contact springs of said ring 3a are closed for 15 seconds (code period) after which said contacts open for 29 seconds and then close again for 15 seconds (second coding period) and then open for 31 seconds.

Commutator ring 4a operates in conjunction with ring 10 on shaft 21. The ring 10, shaft 21, closes contact at the end of a 10 second rotation of said shaft 21 and remains closed for 15 seconds and then remains open for the balance of its cycle rotation of 35 seconds.

The commutator ring 4a of commutator shaft 22 closes the circuit for 15 seconds, then it opens the circuit for 29 seconds, then closes again for 15 seconds, and then causes the circuit to remain open for the duration of the cycle of 31 seconds. It is understood that the call-back motor 78 makes one cycle rotation in 90 seconds, while the commutator shaft motor 65 makes one complete cycle rotation in 60 seconds or one minute.

The wiring connections including ring 4*a*, shaft 22, ring 10, shaft 21, and the call-back motor 78 may be traced from ring 4*a* through wire 107 to ring 10, and from thence through circuit 108 to power lead A of circuit 35. The opposite connecting wire from ring 4*a* connects with the middle connection of motor 78 (connection R′), and connection $B^2$ of said motor 78 connects to power lead B, thus completing the circuit.

In this connection it will be appropriate to bear in mind the protective function of ring 3*a* of shaft 22 with reference to the proper timing of the sound and silence periodic combination of the code. If faultily made, nevertheless the motor will rotate in the right (clockwise) direction to some extent during the 15 second interval, at which time the unauthorized person attempting to obtain the play back messages may happen by mere chance to transmit the code successfully. The function of the ring 4*a* of shaft 22 in conjunction with ring 10 of shaft 21 is to cause the call-back motor 78 to rotate in reverse (counterclockwise) direction thereby restoring the call-back motor 78 from the point it was caused to rotate back to its starting point, the latter reverse rotation takes place for a subsequent caller-in.

The aforesaid operation is caused by the connecting of the connection R′ to the A power wire through the medium of the closing of the circuit of ring 4*a* of shaft 22 and ring 10 of shaft 21 when the shaft 21 reaches its 10 second point of the cycle rotation in an incoming call following the call made by the unauthorized person.

The ring 9*a* of shaft 22, when the latter is rotating in timed relation with the shaft 21, closes the circuit comprising the wire 108 to contact 109 of the message play back regulator 80 and second contact 110 to wire 111 to connection on rewind motor 112 through wire 113 to lead wire B of circuit 35. The opposite contact on ring 9*a* is connected to wire 46*d* to lead A of circuit 35, thus completing the circuit thereof; said closing causes the rewind motor 112 of the recording machine to rewind the magnetic recording wire 64, providing that the play back regulator 80 rewind contacts 109 and 110 are contacting. The latter function will be described hereinafter.

The ring 9*a* stays closed for four seconds after the 15 second code period time duration, after which it causes the circuit to which it is connected to open for 40 seconds, then close again for 25 seconds, and finally open again and remain open up to the 15 second point of the cycle rotation of the shaft 22.

*Message play back regulator*

Brief mention has just been made of the play back regulator 80 which is shown in Fig. 2. The regulator functions when a caller-in from a distant telephone station shall have called his own home or office, and also has successfully transmitted the code comprising measured alternate periods of sound and silence, as already stated. It is then that the magnetic wire 64 is caused to be rewound on the reel 63 after which the motor 55*a* causes it to be wound under the turntable 52, playing back to said caller-in the message or messages recorded upon said magnetic tape or wire. Such rewinding and play back of the wire 64 must be properly timed, so that only that portion of said wire or tape that shall have messages recorded thereon be rewound and played back. This is accomplished in the following manner: The regulator 80 has a dial 114 attached to the shaft 83. A rod 115 projects from said dial 114 which is in contact with an arm 116 that is attached to the shaft of the reset motor 117.

The dial pointer 115 when at zero point or point of inaction through the medium of said pointer contacting with rewind contact 109 pushes the regulator rewind spring contacts 109 and 110 apart, thus opening the rewind motor circuit connected thereto, and by the same token of its contacting with the aforesaid contact, the dial pointer 115 connects the B′ connection of the motor 78 to the power lead, thus causing said motor to rotate in a clockwise direction.

The wire 121 contacting with the contact spring 85 connected to the dial pointer 115 through the medium of the commutator ring 84 and the shaft 83 is tapped on to wire 97 which in turn is tapped on to wire 96 connected with motor 78 connection B′. The foregoing arrangement connects the B′ connection to the pointer 115.

The wire 108 contacting with the rewind contact 109, which is connected to one of the contact springs of ring 9*a* through the medium of the second contact spring of said ring and wire 108*a* tapped on to wire 46*d*, connects the power lead A to rewind contact 109.

Now, having the foregoing in mind, it follows that the contacting of the pointer 115 with the rewind contact 109 would cause the motor 78 to rotate clockwise provided that the contact springs of the ring 9*a* are closed. When the dial 114 moves from the zero point carrying the pointer 115 with it, thus breaking the contact between the power lead A and the B′ connection, and at the same time causing the regulator rewinding contacts 109 and 110 to make contact again owing to the release of the spring tension of said contacts which tend to cause their contacting unless forced apart, as above explained.

The dial 114 is caused to rotate by means of a gear train including shaft 83, spindle wheel 82, and large gear 81 which rotates under impulse of the shaft of turntable 52. Therefore, when the recording motor 55*a* is operated, the turntable 52 and shaft thereof rotate in one direction and the dial 114 also rotates in the same direction; and when the rewind motor 112 is caused to rotate, the turntable 52 rotates in the opposite direction and the dial 114 is thus moved back to its zero or starting point. Now, with every call made, the dial 114 moves clockwise for the duration of the period that the recording motor 55*a* is operated, and while doing so, the dial pointer 115 pushes the L-shaped bar 116, projecting from the reset motor 117, along with it.

Assuming the magnetic wire 64 has accumulated thereon one half hour period message recording during which time the dial pointer 115 has pushed the L-shaped bar 116 half way: If at this point, the absentee telephone subscriber or otherwise authorized person desired that said accumulated messages be played back to him at a distant location from his home or office, said latter location being equipped with the system embodied in my invention, the following procedure would be required of said person:

First, he is to make the usual necessary call to his home or office telephone, thereby obtaining connection with the latter location. The call thus made would start the rotation of the motor 65 and with it the commutator shaft 21. After 10 seconds rotation of the shaft 21 by motor 65, which rotation is caused by the ringing of the telephone bell and the photoelectric arrangement, the contact springs contacting with the commutator rings 2, 3, 4 and 5 become closed thereby enabling the motor 65 to continue rotating independently of the ringing of the telephone bell and its associated apparatus; and also to close the solenoid magnet 27, speaker unit 33 and recording motor 55*a* circuits respectively. At this point the said caller-in will hear the instructions announcing the absence of the owner and directing the caller what to do. These instructions are timed for a 15 second interval after which time (25 seconds of the complete cycle rotation), the contact springs of the commutator rings 6, 7 and 8 close, thereby closing the solenoid 54, the recording box 62 and the bell 34 circuits respectively.

It is at this point also (25 seconds of the cycle rotation) that the contact springs of the ring 9 close, thereby closing the circuit from the B′ connection on the motor 78 to the relay C armature tongue B′ provided the ring 8a of the shaft 22 is also closed. Now the motor 78 is ready to function if the "sound" and "silence" code be properly transmitted in accordance with the prearranged timed closed and open intervals of the rings 1a and 2a as heretofore explained. Here the authorized person must transmit the "sound" and "silence" periodic intervals which comprise the code for a period of 15 seconds during which time (assuming the code be correctly transmitted) the motor 78 would be caused to rotate clockwise and rotating with it the shaft 22.

When the shaft 22 shall have reached its 14 second period point in its cycle rotation (due to correct coding transmission) the contact springs of the commutator ring 12a open and remain open up to the 43 second point (see Fig. 5, 12a) thus disconnecting the circuit leading to the motor 65 from the power lead A thereby causing the shaft 21 (that being at the 39 second point in its cycle rotation) to stop rotating (the code starting point being at the 25 second period point of said shaft plus the 14 second period of the code already transmitted during which time the motor 65 shall have been continuously rotating which accounts for the said shaft being at said point).

The wiring arrangement included with the ring 12 and the timing thereof will be described further in the latter part of this specification.

The reason for halting the shaft 21 at the aforesaid point is to permit during the play back of the message period the functioning of the solenoid magnet 27 together with solenoid 54, recording box 62, and recording motor 55a regardless of the time (which time is given herewith as an example in accordance with the aforesaid procedure, said procedure being in this case of one half hour duration) it takes to play back said accumulated recording of messages.

When said caller-in finishes the 15 second period of selective coding, said coding causes the shaft 22 to rotate to its 15 second period point of cycle rotation. The motor 78 will continue to rotate clockwise regardless of "sound" or "silence" periods that may occur thereafter, the latter rotation of motor 78 being due to the simultaneous closing of the rings 1a and 2a at this time period point. Also at this period point the contact springs of the ring 9a close, thereby closing the rewind motor 112 circuit and thus causing the magnetic wire 65 to be rewound on the reel 63. The wiring circuit included with the ring 9a and the timing rotation thereof has been described previously in connection with the rewinding period of the magnetic wire.

At this juncture it may be well to state that the function of the ring 6a is to prevent the concurrent rotation of the rewind motor 112 rotating the magnetic wire 64 in one direction with the recording motor 55a rotating the magnetic wire 64 in the opposite direction, said circuit being also closed through the closing of the contacts of ring 5 of shaft 21, said shaft being halted at its 39 second period point as stated above. A further understanding relative to said preventive function of the ring 6a may be made clear by following the circuit of the recording motor 55a which may be traced as follows:

One terminal connection of the wire 92 extends to the power lead A as shown in Fig. 1. From the opposite lead thereof connection is made with the wire 91 that extends to one of the spring contacts of the ring 6a, and from the opposite spring contact thereof the wire 90 extends to one of the contact springs of the ring 5 (Fig. 1, shaft 21); from thence wire 93 extends to the power lead B through the medium of the opposite spring contact at the time when both spring contacts are contacting with each other. It can be seen from the above circuit tracing that if the contact springs of the ring 6a are opened, it would open wire connection of the motor 55a with the power lead B thus rendering said motor 55a inoperative. It will now appear clear from the timing of the ring 6a of shaft 22 which opens at the 10 second period point and remains open up to the 19 second period point of the cycle rotation of said shaft (see Fig. 5, ring 6a) that the recording motor will not interfere with the operation of the rewind motor 112.

When the shaft 22 shall have reached its 18 seconds period point of rotation, the rings 1a and 2a open, thereby causing the motor 78 to stop rotating at said point. The necessity for halting said motor at this point and with it the shaft 22 is to provide a closed circuit period of the rewind circuit ring 9a, the said circuit period being as long a time duration as it would take to rewind the messages that shall have accumulated on the magnetic wire 64.

Now assuming that it would take 10 seconds to rewind the half hour accumulation of calls upon the magnetic wire 64 (this being the amount of recorded messages assumed to have been accumulated incident to the calculated example formula exemplified in this specification), it would therefore take the same 10 seconds for dial 114 to return to the zero or initial starting point. When the dial 114 shall have reached this point, the rewind motor circuit will automatically be broken at the regular rewind contacts 109 and 110 which are caused to open contact with each other by means of the movement of the dial 114 and with it the pointer 115 against the rewind contact 109, forcing it away from companion rewind contact 110.

In the process of the above described breaking of the rewind motor circuit, the pointer 115 connects the connection B′ of the motor 78 with the power lead A because of its contacting with the rewind contact 109 in the movement thereof to force said contact 109 away from the contact 110. The foregoing contacting operation causes the motor 78 to rotate and with it the shaft 22 from off the 18 second period rotation point (at which point said rotation shall have been halted, as stated) as on to the 19 second point of rotation of the motor 78 at which point the rings 5a and 6a close their respective contacts with contacting springs contacting therewith, and said closed contacts remain closed up to the 44 second point of rotation thereby closing the speaker 33 and the recording motor 55a circuits respectively. (See Fig. 5, rings 5a and 6a.)

Now, the person transmitting the code will hear the recorded calls or messages played back to said person from the speaker 33 through the medium of the transmitter 24a of the handset 24 (Fig. 1). The timing of the ring 5a and wire connections therewith will be further described hereinafter.

At the 19 second period point of shaft 22 the motor 78 will continue to rotate clockwise regardless of "sound" or "silence" periods that may ensue thereafter due to the simultaneous closing of the rings 1a and 2a at this point. When the motor 78 reaches the 42 second period point in its cycle rotation, the rings 1a and 2a open again causing the motor 78 to stop its rotation at that point. The reason for halting the motor 78 and with it the shaft 22 at said point is to provide a closed circuit period of the rings 5a and 6a as long a time duration that it would take to play back the accumulated recording of messages recorded on the magnetic wire 64 which in this case and in accordance with the above stated operation would be one half hour.

Now, as stated above, when the motor 78 and with it the shaft 22 reaches its 19 second period point of rotation, the ring 6a of shaft 22 (see Fig. 5, 6a) closes, starting the recording motor 55a to play back, said recording motor rotation causing the dial plate 114 to rotate also, as explained, and after the half hour period of accumulated message recordings on the magnetic tape are played back, the dial 114 naturally returns to its halfway position where it had left the L-shaped bar 116 previous to the rewind. When the dial pointer 115 touches the L-shaped bar 116, the lead current feed wire connection A is caused to be connected through commutator ring 120 contacting with contact spring 119 which is connected with wire 118, which connects with one contact spring on ring 10*a* and from the second contact spring on said ring 10*a* to wire 46*d* to the power lead A of the main power feed circuit 35. The opposite contact spring 85 of the message play back regulator contacts with commutator ring 84, which connects with the dial pointer 115; said contact spring 85 contacts with connection B′ of the motor 78 through the medium of wire 121 tapped onto wire 97 which has a tap wire 96 leading to connection B′, as stated.

Now, the contacting of the point 115 with the L-shaped bar 116 (providing the commutator ring 10*a* contacts are closed) will cause the motor 78 to start rotating again and will move it off from the 42 second period point on to the 44 second period point at which point the rings 5*a* and 6*a* of commutator 22 open the circuit to which they are connected, and thus cause the termination of the message play back period. The timing of the closed and open periods of the ring 10*a* is as follows: The contacting springs of the ring 10*a* are open for 42 seconds, after which they close for 2 seconds and then open again for 46 seconds (see Fig. 5, ring 10*a*).

The dial 114 and with it the pointer 115 and the L-shaped bar 116 arrangement provides the means by which the time length of this message play back period may be regulated to correspond with the time length of the messages accumulated on the magnetic wire or tape 64 at any time.

The timing of the closed and open periods of the ring 12*a* is as follows: closed for 14 seconds, then open for 29 seconds after which said ring closes and remains closed up to the 14 second point in the cycle rotation of said ring 12*a* (see Fig. 5, ring 12*a*).

When the shaft 22 shall have reached the 43 second point in its cycle rotation due to the contacting of the pointer 115 with the L-shaped bar 116, as explained above, the ring 12*a* (spring contacts thereof) closes, causing the motor 65 and with it the shaft 21 to resume their rotation from the 39 second point, where they had been halted for the duration of the recorded message play back period for reasons previously pointed out, and to finish the cycle rotation of said shaft, thus causing the phone contacts 31 to open, thereby terminating the current call and at the same time resuming set position in readiness for a subsequent call.

To further clarify the above description of the rotation of the motor 65 and the control thereof through the medium of the ring 12*a*, the circuit wiring therewith may be traced as follows: From one of the connection terminals of the motor 65 (Fig. 1) wire 46*f* extends to one contact spring of the ring 12*a*, said wire being connected to the power lead A through the medium of wire 46*d* and the second contact spring of the ring 12*a* and the wire 46*g*. The aforesaid wiring arrangement can be seen in Fig. 2.

The circuit wire connections of the ring 5*a* (Fig. 2) may be traced as follows: From one of the contact springs of ring 5*a* to wire 68*b* which is tapped onto wire 68*a* (Fig. 1) connecting up with one of the terminal connections of the speaker 33, and from the opposite contact spring of ring 5*a* the wire 68*c* is tapped on to the wire 68 thereby connecting with one of the terminals of amplifier 61 (Fig. 3).

In this manner the contact springs contacting with ring 5*a* when closed place the speaker 33 into operatively receptive position. The timed closed and open periods of said ring 5*a* are as follows: Open for 19 seconds, then closed for 25 seconds, after which said ring remains open for the duration of the cycle rotation.

At the 44 second period point the ring 10*a* of commutator 22 opens and thus breaks the circuit connected to the motor 78 from the dial pointer 115 causing said motor to cease rotating.

At the precise instant of the termination of the 44 second period of rotation of the commutator shaft 22, the ring 1*a* and ring 2*a* of said shaft 22 are in a position with respect to the contacts thereof to enable the code to be repeated by the caller-in and to cause the commutator shaft 22 to continue its rotation clockwise as in the instance when the code was transmitted the first time. Even though the B′ wire connection of motor 78 must be connected to the tongue B′ of the relay C therefrom to power lead A to cause said motor to continue to rotate clockwise, nevertheless the break on the B′ wire connection to said relay tongue caused by the opening of the ring 9 of shaft 21 at its 40 second point in its cycle rotation (which coincides with the 44 second period point of the shaft 22 cycle rotation) will now be closed through the medium of ring 11 of shaft 21 which is an alternate connection. The timing relationship of the shaft 21 to the shaft 22 as stated above is because the motor 65 is halted at the 39 second period point in its cycle rotation during the message play back period and it first resumes its rotation when the shaft 22 is at the 43 second period point in its rotation. It thus follows that when the shaft 22 will have gained one second in its rotation from the 43 second period point, namely, to the 44 second period point, the shaft 21 will have likewise gained one second from the 39 second period point, namely, to the 40 second period point. Ring 11 of the shaft 21 will close at the 40 second period point of rotation thereby closing the B′ connection of motor 78 as stated above, provided that ring 7*a* of shaft 22 is also closed, said ring being included in the wire network. At this point in the rotation of shaft 22 (44 seconds) the shaft 21 is at its 40 second period of rotation, at which point ring 11 of said shaft is closed, as stated. Therefore, the break of the above-mentioned wire B′ will be closed and hence when the code shall have been transmitted at these points (rotation point 44 seconds of shaft 22 and rotation point 40 seconds of shaft 21), the shaft 22 will be caused to rotate under the direction of the code transmission as it was transmitted in the first place. This latter code transmission is identically the same as at first transmitted and is also transmitted within 15 seconds duration of time from the 44 seconds rotation period on rings 1*a* and 2*a* of shaft 22 up to the 59 seconds point of rotation of the latter, after which rings 1*a* and 2*a* are both closed and remain closed for the duration of the rotation of shaft 22, thereby causing the motor 78 to restore the shaft 22 to its initial starting point.

After the second coding is transmitted, that is, at the point 59 seconds period of rotation of shaft 22, the rewind ring 9*a* of shaft 22 closes again for 25 seconds of its rotation, causing the rewind motor to rewind the magnetic recording wire 64 and also to return the dial 114 and with it the point 115 to their starting points. After the termination of the 25 seconds period, said ring 9*a* opens again and remains open up to the 15 seconds point period of rotation of shaft 22. When the shaft reaches its 84 seconds period point in its rotation, the spring contacts of the ring 11*a* are closed for 2 seconds (see Fig. 5, 11*a*) causing the reset motor 117 to bring the L-shaped bar back to its starting point. The wiring connections therewith may be traced as follows: One terminal connection of the reset motor 117 is directly connected to the power lead A through the medium of wire 117*a* and the opposite terminal connection of said reset motor is connected to the power lead B through the medium of wires 117*b* and 117*c* which are connected to the spring contacts of the ring 11*a*.

At the 44 seconds period point of rotation of shaft 22 the listener does not have to transmit the code a second time, thereby causing the rewind motor to rewind. He has the option of leaving things as they are by not transmitting the code again and in this way conserving the messages he has heard and enabling him to replay the messages on the magnetic wire 64 manually upon his return to his office or other location; whereas, if he shall have transmitted the code at the 44 seconds point period of rotation (second transmission) he would thereby cause the magnetic wire 64 to be rewound and thus cause the messages to be obliterated if and when a subsequent caller shall have recorded his message on that same portion of the magnetic wire upon which previous messages have been recorded.

Nevertheless, the fact of having the magnetic wire 64 rewound from its start would be of definite advantage in such a situation where the caller-in feels that until his return to his office there may be anticipated large number of additional calls in his absence which would be desirable to record. Therefore, added facilities must be provided by having a greater length of magnetic wire for the additional incoming messages.

The caller-in can, if he so desires, transmit the code a second time, but in so doing he will cause the magnetic wire 64 to become rewound preparatory for initial starting, as explained.

Further details of the functioning of the opening and closing of the various circuits to which the commutator rings are connected are as follows.

Ring 7*a* of shaft 22 operates in conjunction with ring 11 on shaft 21 to close the break of the connection B' of motor 78. The aforesaid ring closes at the 44 seconds period of rotation of shaft 22 and remains closed for the duration of the cycle of rotation of said shaft.

Ring 8*a* of shaft 22 operates in conjunction with ring 9 of shaft 21 to close the circuit break of the B' wire connection. The ring 8 is closed from the starting point of shaft 22 and remains closed up to the 44 seconds point (second coding period) of said shaft (see Fig. 5, ring 8*a*).

Ring 9 of shaft 21 provides connection with B' connection of motor 78 for a 15 seconds time period only for the period during which the shaft 22 is at the zero start of rotation up to the second coding period, but not beyond the second coding period, because ring 9 operates in the wire network with ring 8*a* of shaft 22 and said ring contact springs are closed only up to the second coding period, as stated above.

Ring 11 of shaft 21 provides a conductor wire from the relay C, tongue B to connection B' for a 15 seconds time period and only for the period from the 44 seconds period point to the end of the cycle rotation of the shaft 22 and not for the first period, because ring 7*a* of shaft 22, which operates in conjunction with ring 11 of shaft 21, is only closed from the second coding period to the end of the cycle rotation of shaft 22 and not for the first period.

The foregoing arrangement is necessary so as to limit the coding time in each coding period for 15 seconds duration only, precluding the possibility of transmitting the 15 seconds coding during a 30 seconds time interval, which interval would be 15 seconds on ring 9 which is closed up to the 40 seconds period point of rotation and 15 seconds on ring 11 of shaft 21 which closes the circuit at the 40 seconds period point of rotation of said shaft 21.

Referring to Figs. 9 and 10, these figures illustrate the contacting peripheries of the various commutator rings extended into horizontal lines divided into degree segments of the respective circles which they represent. These horizontal lines, as for instance, in Fig. 9, numbered from 1*a* to 12*a* inclusive, represent the total number of rings integral to the commutator shaft 22. The time period incidences of alternate contacting of the respective contacting springs contacting with the respective peripheries of the assembly of rings on said shaft 22.

The same arrangement also applies to Fig. 10 of commutator shaft 21 with rings 1 to 11 inclusive integral thereto.

It will be appreciated that shafts 21 and 22 have periodic differences in that shaft 21 rotates at the rate of one revolution per minute, and shaft 22 rotates at the rate of one revolution for a period of one and a half minutes or for 90 seconds.

Figure 4:
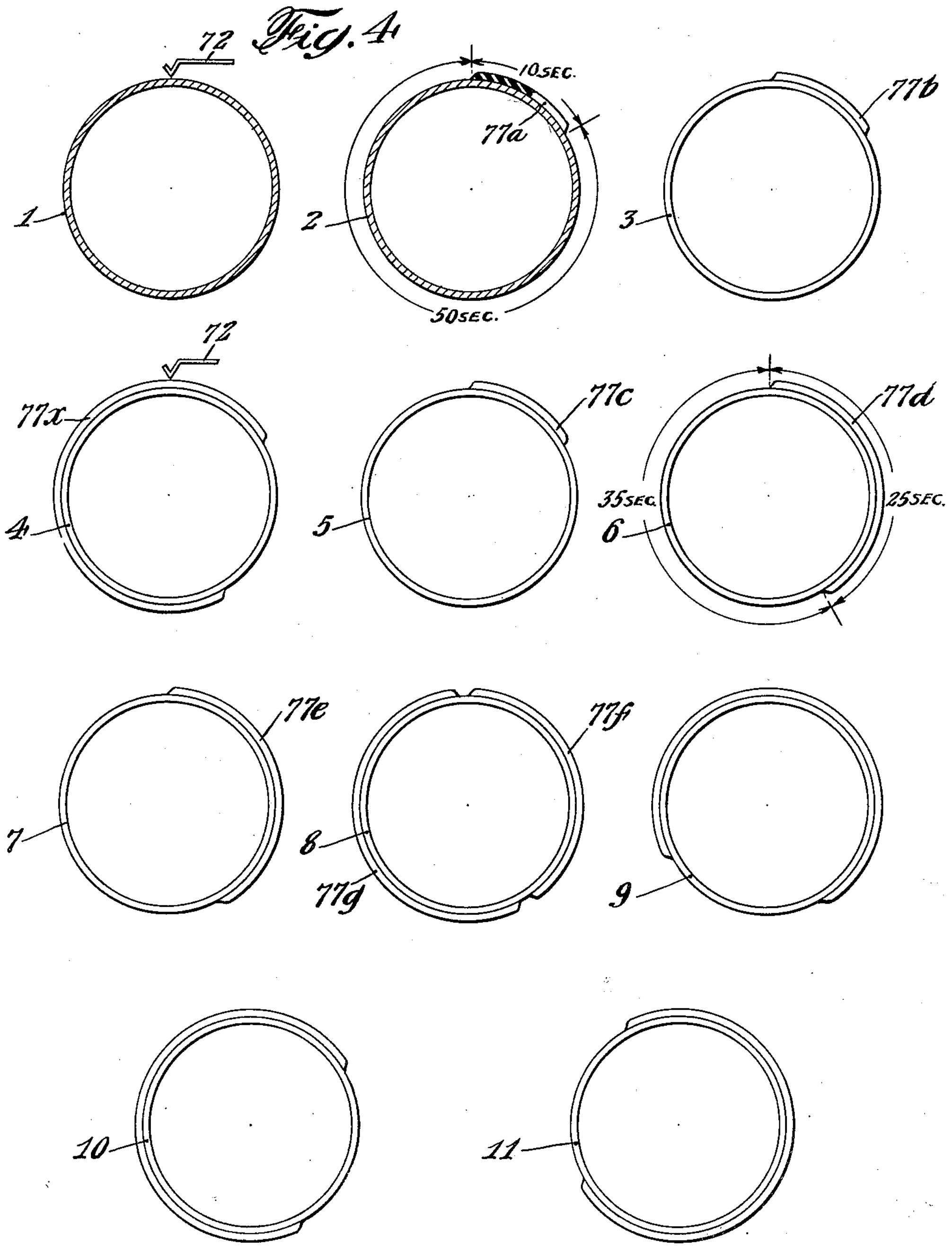
Fig. 4 shows in diagrammatic detail commutators integral to the rotating shaft 21 in Fig. 1.
Figure 5:
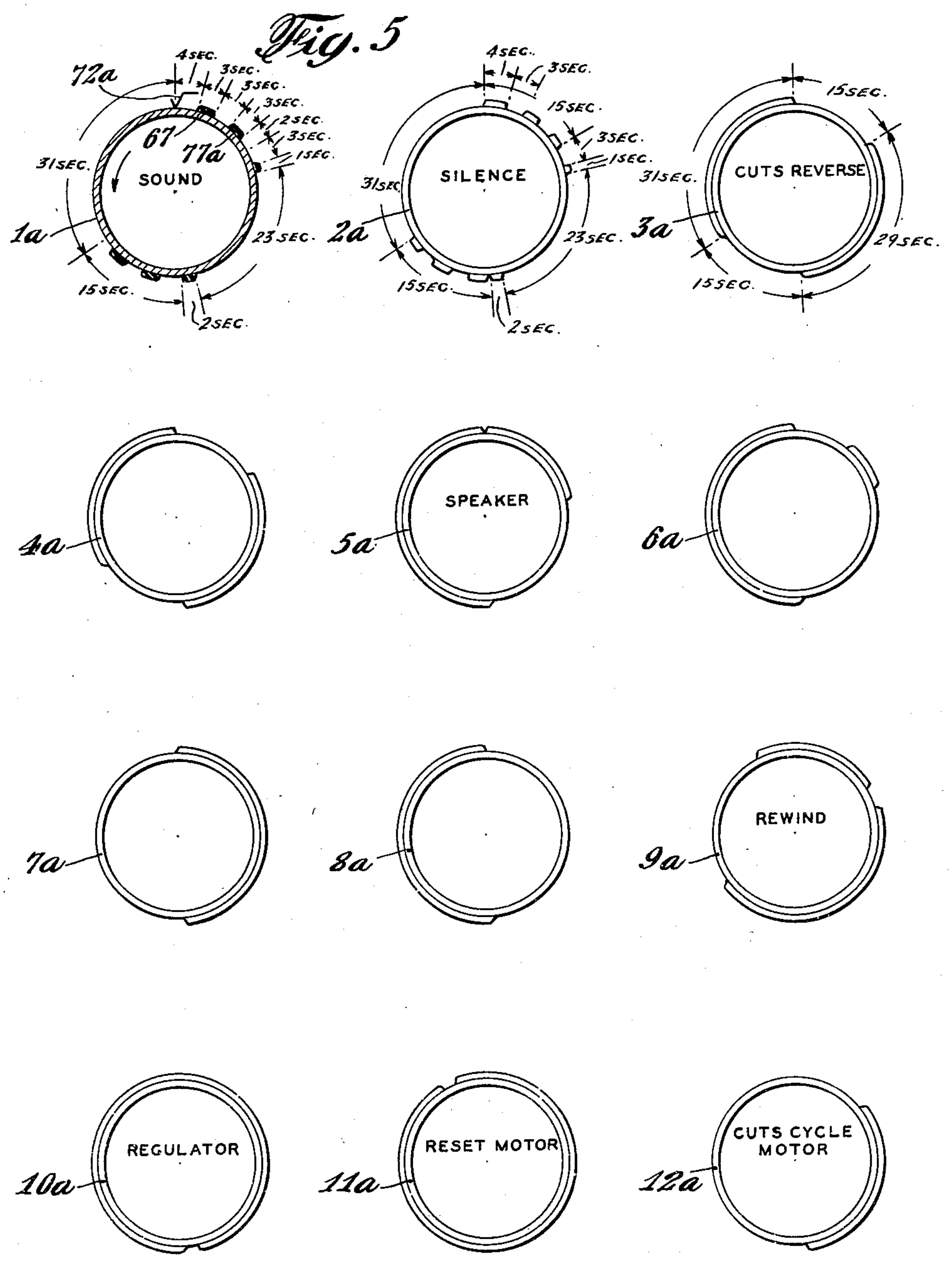
Fig. 5 shows in diagrammatic detail the commutator rings integral to rotating shaft 22.

Further, the series of commutator rings may be seen in Fig. 5 showing rings 1*a* to 12*a* inclusive, and Fig. 4 showing the incidences of alternate circuit contact closings and openings thereof, thereby effecting the various operative functionings of the system described.

The invention comprising the system described, including the shafts 21 and 22 and commutator rings integral thereto, tends to a simplified method of operation requiring a minimum amount of operative apparatus as distinguished from like systems having extensive selective mechanisms and switching means.

Now, having described my invention, what I claim is:

1. In a telephone answering and recording apparatus having means for acoustically coupling a microphone and a speaker respectively to the receiver and transmitter of a telephone set at a subscriber's station, and having a phonograph for transmitting through said speaker vocal instructions over the subscriber's line to a caller-in in regard to recording a message intended for the absentee subscriber and a voice recording unit responsive to said microphone for recording the message, and call responsive means and switching means; automatic means for initiating and controlling the operations of the phonograph and voice recording unit, comprising a call responsive circuit including said microphone responsive to the sound waves produced when the bell of the telephone set rings for generating a signal to initiate a cycle of operations of the answering and recording apparatus, means for amplifying the output of the microphone, means including a relay responsive to the amplified signal, motor means, said relay having an armature with contacting means thereon, said contacting means upon the closing thereof causing rotation of said motor means, a controller device rotatable by the motor means, said controller device having a multiple number of electrical contact rings integral thereto, said rings having contacting spring means contacting therewith, said contact rings and contacting spring means included in a circuit network for controlling the operations of the phonograph and voice recording unit, the rotation of said motor means rotating said controller device and contact rings integral thereto and said contacting springs included in said circuit network contacting therewith and thereby controlling the operations in timed sequence of said phonograph and said voice recording unit.

2. In a telephone answering and recording apparatus having means for acoustically coupling a microphone and a speaker respectively to the receiver and transmitter of a telephone set at a subscriber's station, and having a phonograph for transmitting through said speaker vocal instructions over the subscriber's line to a caller-in in regard to recording a message intended for the absentee subscriber and a voice recording unit responsive to said microphone for recording the message, and call responsive means and switching means; automatic means for initiating and controlling the operations of the phonograph and voice recording unit, comprising a call responsive circuit including said microphone responsive to the sound waves produced when the bell of the telephone set rings for generating a signal to initiate a cycle of operations of the answering and recording apparatus, means for amplifying the output of the microphone, means including a relay responsive to the amplified signal, a motor, said relay controlling the rotation of said motor, a controller device connected to and rotating with said motor, said controller device having a multiple number of electrical contact rings thereon, contacting means contacting with each of said rings, the operation of said phonograph controlled by the rotation of said controller device and said rings thereon in timed rotation of said motor and through the contacting of said ring contacting means selectively contacting in a circuit network included in said automatic means, whereby a verbal message may be transmitted to a caller-in in response to the call thereof, said recording unit comprising a recording medium unit for receiving and recording voice messages, said recording governed as to the timing of the duration of each message being transmitted consequent to said contacting in said circuit network of one or more of said rings on said controller rotated by the motor aforesaid.

3. The apparatus as set forth in claim 2, and a circuit included in said automatic means controlled by the rotation of said controller device and through the medium of said controller contacting means, said circuit including an electric bell, the sounding of said bell signalling to said caller-in to begin speaking the message, and said circuit operative to subsequently sound said bell to indicate the limit time length of said message to be recorded in the recording unit aforesaid.

4. The apparatus as set forth in claim 1 in which said controller rings have insulation sections mounted on the respective peripheries thereof, said insulation sections arranged in various lengths in accordance with a prescribed code, said contacting spring means contacting respectively with the periphery of each of said controller rings, said contacting spring means connected respectively into a network of circuits included in said automatic means whereby a single circuit or a number of single circuits may be opened and closed in timed relation with the rotation of said motor means, said varied lengths of said insulation upon said controller rings enabling the opening of one or more of said single circuits in accordance with the coded transmission means controlling the operation of the apparatus comprising said automatic means for enabling the reception of both outside calls and the response thereto and the recording of messages in timed sequence upon said recording unit.

5. The apparatus as set forth in claim 1, said controller ring contacting means comprising a multiple number of metallic rings integral to said controller, said rings having insulation sections mounted on the peripheries thereof, said insulation sections arranged in various lengths in accordance with a prescribed code, contacting springs contacting respectively with each periphery of said rings, said contacting springs electrically connected into a network of circuits included in said automatic means whereby a circuit or circuits in said circuit network may be opened or closed in timed relation with the rotation of said motor, said varied lengths of insulation upon said rings enabling the opening of one or more of said circuits in accordance with the coded operation of said apparatus for enabling the reception of both outside calls and the recording in timed sequence of messages therein.

6. The apparatus as described in claim 1, said automatic means including a motor which drives a second controller having a multiple number of controller rings integral thereto, said rings having contacting spring means contacting therewith, said contacting spring means connected in said wire circuit network including said first controller and rings thereof for the purpose of receiving a coded combination of signals through the medium of said telephone receiver of said telephone set and into said microphone amplifier means, and said receptor means and the energizing of a second relay having contacting means thereon responsive to said receptor means causing thereby the rotation of said motor and said second controller, said rotation of said motor and said controller including the controller rings thereof enabling the selection of a circuit or circuits in said circuit network to switch in for operation said receiver of said subscriber's telephone set, said voice recording unit comprising a magnetic recording medium, said circuit selection also causing said magnetic recording medium means to be activated with the consequent unwinding of said recording medium enabling the repeating of the message or messages thereon over said transmitter of said subscriber's telephone set and over the regular telephone system of the telephone company to said listening caller-in who shall have transmitted said coded signals at a distant point from said telephone subscriber's station.

7. The apparatus as described in claim 1, and said automatic means including for the purpose of transmitting a coded combination of signals to enable a repeat back of a message or messages that shall have been stored in said recorder unit to a distant caller-in over a regular telephone company telephone circuit, a second motor to which is geared a second controller, said controller having controller rings integral thereto, contacting spring means contacting respectively with each of said commutator rings, said contacting spring means connected in said wire circuit network, said first controller and rings also connected in said network, means responsive to said coded combination of signals when transmitted by said caller-in causing the selection of a circuit or circuits in said circuit wire network through the medium of the rotation of said motors, a flexible elongated recording medium and means responsive to the reception of said coded combination of signals for causing said recording means to be activated and the consequent rerunning of said recording medium and the repeating back of the message or messages thereon over said transmitter of said subscriber's set to said caller-in who transmitted said coded combination.

8. The apparatus as set forth in claim 1, and said automatic means also including means to enable a distant caller-in to obtain a repeat back of messages stored in said voice recording unit, said unit including a windable magnetic recording medium said latter means responsive to the reception of code signals consisting of the combination of a period of sound transmission and a period of silence, said sound and silent periods being performed by said caller-in in measured periodic sequence alternately transmitted from the distant station, and which when so transmitted and received cause the automatic switching in of said receiver and transmitter of said subscriber's set, and including means for causing the switching in of the circuit controlling said message recorder unit and the activation thereof, means for causing the unwinding of the magnetic medium and means for repeating back the record messages thereon through the medium of the transmitter in said subscriber's set over said telephone company's circuit and received by said distant caller-in.

9. The apparatus as described in claim 2, and said motor being reversible in the rotation thereof, said reversible rotation of said motor being caused through the medium of a condenser and a relay connected therewith, said relay having an armature, said armature having contacting means contacting with contacts connected with said motor and said circuit network, said contacting of said armature contacting means with said motor contacts caused by selection means controlled by said transmission into said automatic means of coded transmission of sound and silence periods of a caller-in at a distant station on a telephone company circuit, said circuit being connected to said apparatus incident to the call of said caller-in.

10. The apparatus as set forth in claim 1, said recording unit including a windable magnetic recording medium, said phonograph having a tone arm thereon, a solenoid magnet mounted contiguous to the tone arm of said phonograph, said solenoid magnet when energized through the medium of circuit selective means acting upon said tone arm to cause the moving thereof off from the record disc on said phonograph and said disc to remain clear thereof during the rewind period of said magnetic recording medium in the recording unit aforesaid.

11. The apparatus as described in claim 1, said automatic means including a solenoid magnet positioned over the base of a subscriber's telephone set, a weight positioned over contact rods in the base of said telephone subscriber's set, the handset of said telephone subscriber's set being positioned contiguous to said microphone and said receiver of said apparatus, said solenoid having an armature plunger, said plunger lifting said weight from said contacts in said telephone base upon the energization of said solenoid through circuit selection in said automatic means thereby enabling the switching in for service the transmitter and receiver of said telephone handset.

12. The apparatus as set forth in claim 1, said automatic means including a windable and flexible magnetic message storage medium and a rewind message recording and playback regulator means, said regulator means including a motor winding for winding said magnetic storage medium in timed relation with the transmission of the vocal message transmitted by a caller-in; and playback means for playing back material recorded on said medium at the coded call of a distant caller-in and repeating back said recorded message upon said tape, and motor rewinding means for rewinding said storage medium to the original winding thereof and in the same windup that prevailed prior to the time that the first incoming message was recorded, said playback regulator means regulates the time of the recorded message to correspond in timed relation with the time required to play back the amount of messages accumulated on said magnetic storage medium at any particular time.

References Cited in the file of this patent

UNITED STATES PATENTS

| | | |
|---|---|---|
| 2,171,366 | Hipple | Aug. 29, 1939 |
| 2,374,842 | Shively et al. | May 1, 1945 |
| 2,519,568 | Handschin | Aug. 22, 1950 |
| 2,533,234 | Edwards | Dec. 12, 1950 |
| 2,537,407 | Handschin et al. | Jan. 9, 1951 |
| 2,549,548 | Von Zimmermann | Apr. 17, 1951 |